United States Patent
Chen et al.

(10) Patent No.: US 6,332,964 B1
(45) Date of Patent: Dec. 25, 2001

(54) MULTI-PHASE SOLID ION AND ELECTRON CONDUCTING MEMBRANE WITH LOW VOLUME PERCENTAGE ELECTRON CONDUCTING PHASE AND METHODS FOR FABRICATING

(75) Inventors: Chieh Cheng Chen, Gatzville; Ravi Prasad, E. Amherst, both of NY (US); Terry J. Mazanec, Naperville; Charles J. Besecker, Batavia, both of IL (US)

(73) Assignees: Praxair Technology, Inc.; BP Amoco Corporation, both of Danbury, CT (US)

( * ) Notice: Subject to any disclaimer, the term of this patent is extended or adjusted under 35 U.S.C. 154(b) by 0 days.

(21) Appl. No.: 09/488,992

(22) Filed: Jan. 20, 2000

Related U.S. Application Data

(63) Continuation-in-part of application No. 09/241,611, filed on Feb. 2, 1999, now Pat. No. 6,187,157, which is a continuation-in-part of application No. 08/775,683, filed on Dec. 31, 1996, now Pat. No. 5,911,860.

(51) Int. Cl.$^7$ .................................................... C25B 13/00
(52) U.S. Cl. ............................ 204/295; 204/296; 429/30; 429/33
(58) Field of Search ...................... 429/30, 33; 204/295, 204/296

(56) References Cited

U.S. PATENT DOCUMENTS 5,624,542 * 4/1997 Shen et al. .............................. 429/33

* cited by examiner

*Primary Examiner*—Bruce F. Bell
(74) *Attorney, Agent, or Firm*—David M. Rosenblum

(57) ABSTRACT

A multi-phase solid electrolyte ion transport membrane comprising at least two phases wherein one of the phases comprises an oxygen ion single conductive material. The other phase comprises an electronically-conductive metal or metal oxide conducting phase is present in a low volume percentage. One method for achieving this result incorporates the minority phase into the powder from which the membrane is made by deposition of the metal or metal oxide from a polymer made by polymerizing a chelated metal dispersion in a polymerizable organic monomer or prepolymer. The multi-phase composition advantageously comprises a first phase of a ceramic material and a second phase of a metal or metal oxide bound to a surface of the ceramic material. A second method fabricates the membrane from a mixture of two powders one of which contains a mixture of the two phases.

22 Claims, 6 Drawing Sheets

Conventional Method

First Advanced Method

MULTI-PHASE SOLID ION AND ELECTRON CONDUCTING MEMBRANE WITH LOW VOLUME PERCENTAGE ELECTRON CONDUCTING PHASE AND METHODS FOR FABRICATING

CROSS REFERENCE TO RELATED APPLICATIONS

This patent application is a continuation in part of U.S. patent application Ser. No. 09/241,611, now U.S. Pat. No. 6,187,159 entitled "Multi-Phase Solid Electrolyte Ionic Transport Membrane and Methods for Fabricating Same", filed on Feb. 2, 1999, which is a continuation in part of Ser. No. 08/775,683, now U.S. Pat. No. 5,911,860, entitled "Solid Electrolyte Membrane with Mechanically-Enhancing Constituents" that was filed on Dec. 31, 1996. patent application Ser. No. 08/775,683 is incorporated herein by reference in its entirety.

U.S. GOVERNMENT RIGHTS

This invention was made with United States Government support under Cooperative Agreement No. 70NANB5H1065 awarded by the National Institute of Standards and Technology. Therefore, the United States Government has certain rights in the invention.

FIELD OF THE INVENTION

This invention relates generally solid electrolyte ion transport membranes and to methods for preparing such membranes and, more particularly, to such membranes having at least two continuous phases wherein one of the phases comprises an oxygen ion conductive material, or a mixed conductor, and wherein the second phase comprises an electronically-conductive metal and occupies a minor percentage of the membrane volume. The second phase can be incorporated into the membrane by deposition of the metal from a chelated metal dispersion in an organic polymer. Alternately the membrane is composed of a powder containing a mixture of the first phase material and the second material and a second powder containing the first phase material only. The objective of the invention is to maximize the volume of the ionic phase for high ion transport and minimize the volume of the electronic conducting phase to levels below those achieved by the prior art while retaining continuity in both phases. The resultant structure comprises two interpenetrating continuous networks, one network for oxygen ion transport and one network for electron transport. The invention is useful in fabricating ion transport membranes having porous catalytic surface exchange enhancements, and for making electrodes for solid oxide fuel cells.

BACKGROUND OF THE INVENTION

Solid electrolyte ion transport membranes have significant potential for the separation of oxygen from gas streams containing oxygen. Of particular interest are mixed conductor materials that conduct both oxygen ions and electrons and hence can be operated in a pressure driven mode without the use of external electrodes.

In an ionic or mixed conducting membrane reactor, a solid electrolyte membrane that can conduct oxygen ions with infinite selectivity is disposed between an oxygen-containing feed stream and an oxygen-consuming, typically methane-containing, product or purge stream. The membrane elements have "oxygen selectivity," which means that oxygen ions are exclusively transported across the membrane without transport of other elements, and ions of other elements. Such membranes may also be used in gas purification applications as described in European Patent Application Publication No. 778,069 entitled "Reactive Purge for Solid Electrolyte Membrane Gas Separation," issued to Prasad et al.

Composite ceramic mixed conductor membranes comprised of multi-phase mixtures of an oxygen ion conductive material and an electronically-conductive material are known. Exemplary multi-phase ceramic compositions of this type are disclosed in U.S. Pat. No. 5,306,411 (Mazanec et al.) and U.S. Pat. No. 5,478,444 (Liu et al.). Such compositions are also taught by C. S. Chen et al. in *Microstructural Development, Electrical Properties and Oxygen Permeation of Zirconia-Palladium Composites,* Solid State Ionics 76: 23–28 (1995). These patents and this technical journal article are all incorporated herein by reference in their entireties. In order to develop a membrane suitable for use in pressure driven oxygen separation, an electronic conductivity characteristic has to be added to pure ionic conductors, thereby creating multiphase mixed conductors. This is typically accomplished by adding an electronically-conductive phase, such as Pt or Pd, to the ionic conductor in volume percentages above the percolation limit (typically greater than 30%) to obtain a continuous electronically conducting phase that exists as a continuous interpenetrating network with the oxide ion conducting phase.

In contrast to multi-phase mixed conductors, true mixed conductors, which are exemplified by perovskites such as $La_{0.2}Sr_{0.8}CoO_x$, $La_{0.2}FeO_x$, $La_{0.2}Sr_{0.8}Fe_{0.8}Co_{0.1}Cr_{0.1}O_x$ and others, are materials that possess intrinsic conductivity for both electrons and ions in a single phase. Some of these materials possess some of the highest oxygen ion conductivities known, as well as rapid surface exchange kinetics. U.S. Pat. No. 5,702,999 (Mazanec et al.) and U.S. Pat. No. 5,712,220 (Carolan, et al.) disclose mixed oxide perovskites of this type that are useful for oxygen separation. However, while there is great potential for these materials in gas separation applications, there are some drawbacks in their use.

A common problem among most ceramic mixed conductors, including perovskites, is their fragility and low mechanical strength in tension, which makes it difficult to fabricate large elements, such as tubes, and deploy them in commercial systems requiring high reliability. These problems have been recognized and reported in technical journal publications, such as, for instance, Yamamoto et al. in Perovskite-Type Oxides as Oxygen Electrodes for High Temperature Oxide Fuel Cells, Solid State Ionics 22: 241–46 (1987); and B. Fu et al. in $(Y_{1-x}Ca_x)$ $FeO_3$: A Potential Cathode Material for Solid Oxide Fuel Cells, Proc. 3rd Intl. Symp. on Solid Oxide Fuel Cells, S. C. Singhal, Ed., The Electrochem. Soc. Vol. 93–4: 276–282 (1993).

U.S. Pat. No. 5,911,860 discloses dual phase solid electrolyte ion transport materials comprised of a mixed conductor such as perovskite and a second phase such as Ag, Pd or an Ag/Pd alloy. This patent discloses that the introduction of a metallic second phase to a ceramic mixed or pure ion conductor such as perovskite prevents microcracking during fabrication of the membrane, and enhances the mechanical properties and/or surface exchange rates, as compared to those provided by a mixed conductor phase alone.

The introduction of a metallic second phase into ceramic mixed conductors is thus desirable for solid electrolyte ion transport membrane manufacture, not only for ceramic conductors, where the metallic phase is needed to achieve electronic conductivity, but also for true mixed conductors such as perovskites, where the metallic phase enhances mechanical properties and/or catalytic performance, as well as possibly enhancing the desired electronic conductivity. The most common technique disclosed in the prior art for introducing a metallic second phase into a solid electrolyte ion transport membrane is powder mixing. Illustrative of powder mixing techniques are the following patents:

(A) U.S. Pat. No. 5,306,411 (Mazanec et al.) discloses a typical powder mixing process to fabricate solid electrolyte ion transport membranes comprising gas impervious, multi-phase mixtures of an electronically-conductive material and an ion-conductive material and/or gas impervious, single phase mixed metal oxides of a perovskite structure. A mixture of La$(C_2H_3O_2)_3 \cdot 1.5H_2O$, $Sr(C_2H_3O_2)_2$ and $Co_3O_4$ was placed into a polyethylene jar mill, together with $ZrO_2$ media and acetone, and rolled for 70 hours. The resulting slurry was decanted and vacuum distilled at room temperature until dry. The solids were then calcined in air in an evaporating dish for 12 hours at 900° C. and 6 hours at 1100° C.

(B) U.S. Pat. No. 5,712,220 (Carolan et al.), discloses a membrane containing a dense multicomponent metallic oxide layer formed from $La_{0.2}Ba_{0.8}Co_{0.62}Fe_{0.21}O_{3-z}$. This composition was prepared by a powder preparation technique wherein various applicable weighed quantities of $La_2O_3$, $BaCo_3$, $CoO$, $Fe_2O_3$ and $CuO$ were mixed and ball milled for 12 hours. The mixture was then fired in air to 1000° C. for 24 hours followed by cooling to room temperature. The mixture was then ground by ball milling, remixed and refired. The resulting perovskite powder was milled in air to about 1–5 micron particle sizes and combined with a plasticizer, binder and toluene solvent to form a slip, suitable for tape casting.

(C) U.S. Pat. No. 5,624,542 (Shen et al.) is primarily concerned with improving the mechanical strength of an ion conducting dense membrane by inclusion of a second metallic phase within the matrix described therein. The patent's independent claims disclose continuous electronic conductivity for a range of volume percent of the electronic conducting metal phase within the range of between 10 and 50 percent. However, the lower limit of 10 percent appears to contradict the discussion in the specification (column 6, lines 1–25) of this patent, which reports findings of a lower limit of 20 to 35 volume percent and recommends lower limits of 1 to 5 percent above that value. These disclosures are not believed to suggest or describe the present inventors' preferred limit of volume percentages of the electronic conducting phase within the matrix of less than 20 percent. Also the Shen patent does not address methodology for producing porous matrices composed of two phases of ion conduction oxides and metals. Indeed, the manufacturing method disclosed by the Shen patent involves the production of a mixed ionic-electronic conducting ceramic/metal composite by ball milling, including the steps of mixing and grinding ceramic components with a metal powder or metal oxide, followed by forming and sintering to provide the desired membrane. Grinding of the metal and ceramic components in accordance with the '542 patent is said to produce a particle size for the ball-milled metal and ceramic components of from about 0.5 micron to about 1 micron.

Other techniques for adding second phase metallic materials to solid electrolyte ion transport membranes are also known. For example, U.S. Pat. No. 5,306,411 (Mazanec et al.) discloses a technique in which the ceramic precursor components are added to deionized water and the solution is spray-dried to produce small droplets having a diameter of about 20–50 microns. The droplets are then dehydrated with preheated dry air, resulting in a powder having an average particle size of approximately 5 microns.

U.S. Pat. No. 5,624,542 (Shen et al.) discloses generally, in column 6, lines 45–50 thereof, that mixed ionic-electronic conducting ceramic/metal composites can also be formed by chemical vapor deposition, electrochemical vapor deposition, dip-coating, and sol-gel processing. However, these methods differ in their result from the powder mixing and spray drying techniques described above. Because they are designed to be applied after the formation of a first phase membrane, these methods are more suited for the preparation of multi-layer separation membranes than composite mixed-conductor membranes. Thus, these prior art coating techniques are not suited for introducing a metal into solid electrolyte ion transport precursor materials prior to the formation of the solid electrolyte ion transport membrane.

Multi-layer separation membranes are known in the art. For example, Yasutake Teraoka et al. reported solid state gas separation membranes formed by depositing a dense mixed conducting oxide layer onto a porous mixed conducting support in Jour. Ceram. Soc. Japan. International Ed., Vol.97, No.4, pp.458–462 and No. 5, pp.523–529 (1989). The relatively thick porous mixed conducting support provides mechanical stability for the thin, relatively fragile dense mixed conducting layers. The article does not discuss two phase membrane materials. Other exemplary multi-layer ceramic membranes are disclosed in U.S. Pat. No. 4,791,079 (Hazbun); U.S. Pat. No. 5,240,480 (Thorogood et al.); U.S. Pat. No. 5,494,700 (Anderson et al.); and U.S. Pat. No. 5,342,431 (Anderson).

The Anderson et al. ('700) patent disclose a method for preparing a membrane substrate coated with a dense crack-free metal oxide film made by dissolving metal ions in a polymerizable organic solvent, such as ethylene glycol. Generally the method of the '700 patent comprises: (1) preparing a starting solution containing cations of the desired oxide's metal constituents dissolved in an aqueous mixture of the polymerizable organic solvent; (2) heating the starting solution to form a polymeric precursor; (3) depositing a thin film of the polymeric precursor onto a substrate using a conventional spin-coating technique; and (4) calcining the deposited precursor film to convert it into a polycrystalline metal oxide film.

The Anderson ('431) patent discloses a method for incorporating a metal oxide film onto a ceramic membrane comprising the steps of (a) passing a dilute colloidal suspension ("sol") of metal oxide particles suspended in water or alcohol by one side of a porous support, (b) converting the sol into a gel by removing the solvent, (c) drying the gel to form a "xerogel," and (d) sintering the xerogel to create a porous metal oxide ceramic membrane that is said to be useful in ultrafiltration, reverse osmosis, or gas separation.

In summary, the introduction of a metallic second phase into solid electrolyte ion transport membranes is a useful step in the fabrication of mixed ionic-electronic conducting ceramic composites, and creates materials with great potential for gas separation and solid oxide fuel cell electrodes. However, the techniques heretofore taught in the prior art for introducing a metallic second phase pose several difficulties for commercial utilization of this technology.

For instance, the existing techniques for introducing a metallic second phase into solid electrolyte ion transport membranes often require large quantities of the second phase metallic material, which increases costs and can lead to lower ionic conductivity of the mixture. In a simple dual phase mixed conductor system comprised of an oxygen ion conductive material and an electronically-conductive material, the percolation theory is usually used to predict the volume fraction of the second (metallic) phase required to achieve electronic conductivity in a mixed conductor system. The minimum value of the volume fraction required to achieve a continuous second phase typically falls in the range of about 30%, although this value can vary markedly, depending upon the relative sizing of the individual components.

Prior technical literature discloses that the metallic second phase usually constitutes more than 40% of the volume of the composite. This amount is typically necessary to ensure that the conducting phase is above the percolation limit in order to obtain a composite electronic/ionic mixed conductor. For example, a technical journal article *Microstructural Development, Electrical Properties and Oxygen Permeation of Zirconia-Palladium Composites,* Solid State Ionics 76: 23–28 (1995), C. S. Chen et al., reported that a percolative Yttria-stabilized cubic zirconia (YSZ)—palladium dual phase composite, containing 40% Pd by volume, showed a much larger oxygen permeability than that of a non-percolative composite containing 30% Pd by volume indicating a percolation limit between 30 and 40%. The high cost of a compatible second phase (e.g. Pd, Pt), coupled with the high volume required by the prior art techniques, makes it difficult to commercialize these solid electrolyte ion transport membranes.

Also, since the second phase is a pure electronic conductor, any excessive use of second phase material, which is typical of the prior art techniques, results in a reduction of the overall ionic conductivity of the composite, a clearly undesirable result for high performance in oxygen transport.

In the case of true mixed conductors, such as perovskites, to which a metallic second phase may be added to enhance mechanical properties and/or catalytic efficiency (see U.S. patent Ser. No. 08/775,683), conventional techniques for introducing the second phase may reduce the benefits derived from their use. In the prior art, dual phase solid electrolyte ion transport powders of these materials were usually prepared by mixing various weight ratios of second phase alloys and solid electrolyte ion transport powders using a conventional powder mixing process. However, during the conventional powder mixing process a non-uniform dispersion of the second phase can result in lower mechanical strength of the ceramic composite due to the lack of homogeneity of the mixed material.

There is need, therefore, for a new method for incorporating a metal or metal oxide into an ionic or mixed ionic/electronic ceramic membrane prior to fabricating the membrane in order to achieve a reduction in the amount of material required for the second phase and to attain a uniform deposition of the metal or metal oxide within the ceramic membrane substrate, thereby enhancing the mechanical properties and/or the overall transport efficiency of the membrane. There is also a need for the resulting improved membrane itself.

OBJECTS OF THE INVENTION

A first object of the invention is to provide methodology for achieving a continuous electron conductivity for a two phase conductor comprising two continuous interpenetrating networks of ion and electron conducting materials where-in the volume of the electron conducting second phase material is substantially reduced below conventional percolation limits.

A second object of the invention is to provide improved methods for fabricating a multi-phase solid electrolyte ion transport membrane or porous layer by providing uniform surface deposition of a metal or metal oxide onto a ceramic powder, and forming the membrane from the resultant multi-phase material with a reduced quantity of the second phase material, or by mixing an ion conducting ceramic powder with a second two phase ion and electron conducting powder within the percolation limits of the two powders and forming the membrane from the resulting mixture which now contains a reduced quantity of the second phase material.

Another object of this invention is to provide an improved solid electrolyte ion transport membrane, having enhanced mechanical and/or catalytic properties.

A further object of this invention is to extend the above techniques to the fabrication of porous surface exchange enhancing layer or layers for ion transport membranes, as well as electrodes of solid oxide fuel cells or electrodes of electrically driven ion transport membranes.

These and other objectives will become apparent from reading the following detailed description of the invention.

SUMMARY OF THE INVENTION

In one aspect, the present invention relates to a multi-phase solid electrolyte ion transport membrane comprising two interpenetrating continuous phases or to a porous layer that contains substantially less of the second phase than the prior art requires to achieve a continuous second phase and attains both electronic and ionic conductivities greater than 0.01 S/cm 1000° C. Two methods are presented for achieving this objective.

According to the first method, the membrane material comprises a first phase, in granulated or matrix form, comprising an ionic conductor or mixed ionic/electronic conductor, and a second phase comprising particles of a metal or metal oxide coating the surface of the granules of the first phase. The method comprises several steps. First, the metal ions are chelated into an aqueous or organic mixture comprising a polymerizable organic monomer or prepolymer plus a chelating agent. Second, this mixture is heated to a temperature sufficient to polymerize the polymerizable organic monomer or prepolymer in order to provide a liquid polymeric composition containing chelated metal or metal oxide particles. Third, the liquid polymeric composition containing the chelated metal or metal oxide is contacted with the granulated first phase, and mixed to provide a homogeneous admixture comprising the granulated first phase coated with the polymeric composition. Fourth, the homogeneous admixture is heated to a temperature sufficient to combust the polymeric composition and uniformly deposit the particles of metal or metal oxide onto the surfaces of the first phase granules. Lastly, the resulting multi-phase metal-coated solid electrolyte powder is optionally calcined in order to form a polycrystalline metal oxide coating on the surfaces of the first phase, and then further processed (e.g., by sintering or cold pressing) to form the desired multi-phase solid electrolyte ionic transport membrane.

The second method comprises preparing a dual phase membrane by mixing an ion conducting powder with a composite powder and then sintering the mixture to achieve an overall porous or nonporous structure as desired. The composite powder can be prepared by spray pyrolysis or other technique to generate a powder that comprises a mix of the electronic and oxide ion conducting phases at the level of the individual grains. The important point is that the second electronic conducting phase forms a continuous network upon sintering or further treatment. For oxygen transport membranes the minority conducting phase will typically be the electronic conducting phase and the majority phase will be the oxide ion conducting phase, but the opposite is also envisioned by this invention. The composite powder can comprise at least thirty percent and less than 70 percent by volume of said matrix.

A modification of this second method comprises a combination of the first and the second method. According to this method, a first powder is prepared from an ion conducting metal oxide using the methodology previously described, and then provided with a surface deposition of a second electronic conducting phase in the form of a metal or electronic conducting metal oxide using the techniques of the first method described above. The resulting second powder is then mixed with an ion conducting powder in volumetric proportions that assure continuity of both phases. A layer is then formed from the resulting powder mixture and sintered to obtain a dense membrane or porous layer as desired. This modified method can achieve a very low volume percentage of a second continuous phase.

The minority phase in the porous or dense layers prepared by the aforementioned method is present in proportions such it occupies from 0.1 to 25 percent of the layer volume and preferably from 1 to 20 percent of the layer volume.

In another aspect, the present invention relates to the multi-phase solid electrolyte ion transport membrane itself. The membrane, suitably fabricated by any of the methods described above, comprises a matrix material that conducts at least one type of ion, preferably oxygen. This membrane comprises at least one constituent that is physically distinct from the matrix material, namely the second phase of metal or metal oxide. The second phase enhances the mechanical and/or catalytic properties of the membrane and provides electron conductivity to the membrane when ion-only conducting oxides are used. The second phase is sutably incorporated into the membrane as by any of the methods described above. The second phase is present in the multi-phase membrane in a quantity that, by random mixing of like size particles, would normally preclude, continuous electronic conductivity through the constituent across the membrane, that is, it is below the generally accepted percolation limit. The second phase comprises at least one percent and less than thirty percent of the volume of said matrix. In a preferred aspect, the matrix material comprises a mixed conductor which exhibits both electronic and oxygen ion conductivity, and the second phase meal is silver, palladium, an oxide thereof, or a combination thereof.

These and other aspects will become apparent upon reading the following detailed description of the invention.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

The present invention relates to membranes composed of an ion and an electron conducting phase where both phases are continuous but wherein one of the phases, preferably the electron conducting phase, is present in a volume percentage below normal percolation limits. Also described are methods for achieving a continuous low percentage volume of the minority phase within the membrane matrix.

Figure 1:
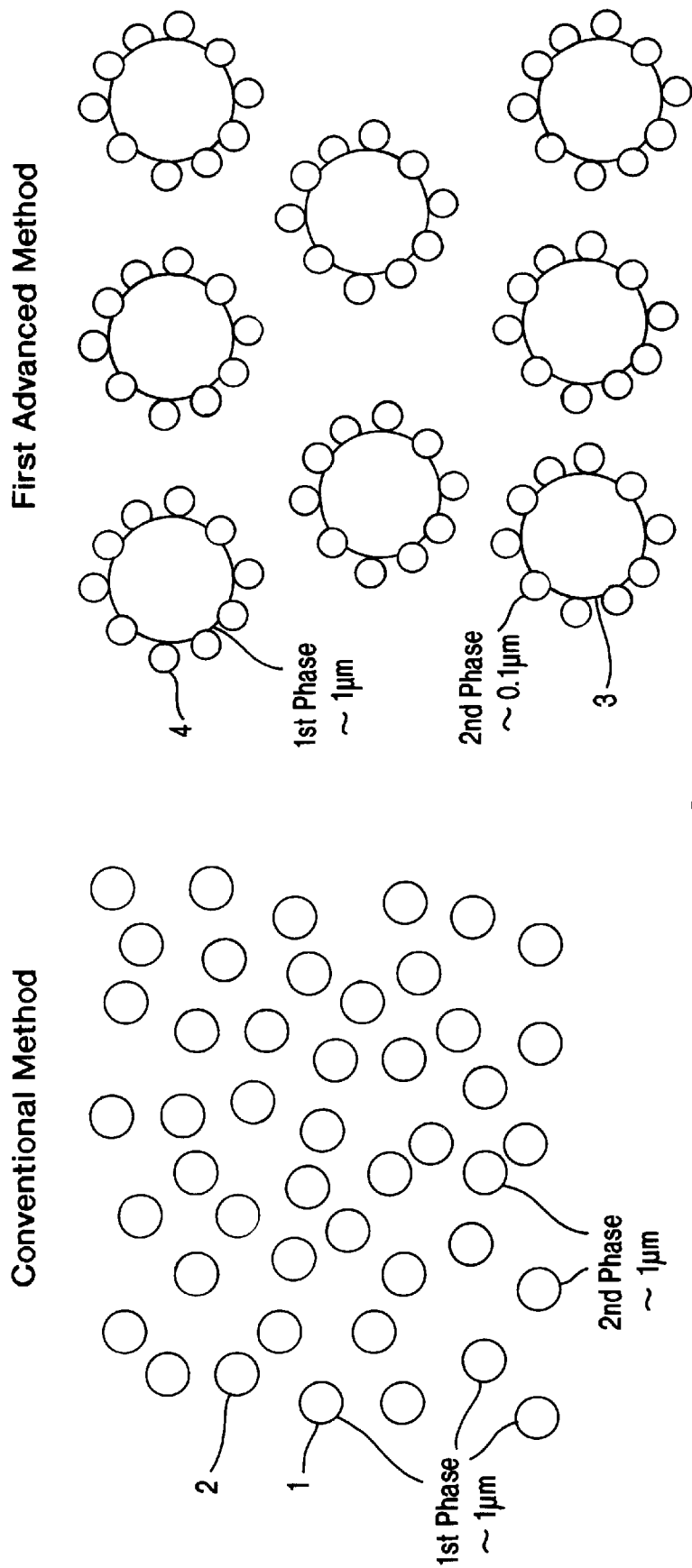
FIG. 1 is a schematic drawing representing the conventional synthesis route and a first method of preparing a membrane of this invention.

The present invention relates, in another aspect, to a process for making multi-phase metal or metal oxide-coated solid electrolyte ion transport powder using a liquid polymeric precursor as a carrier for a chelated form of the metal or metal oxide. FIG. 1 shows a schematic representation of this method in comparison to the conventional method. In the conventional method powders of the ion conducting phase 1 and the electronic conducting phase 2 are mixed in proportions within the limits governed by percolation theory. The products of the first method of this invention are loose powders of solid electrolyte ion transport materials 3 which are intimately coated with a second phase material 4, such as Pd, Ag or Pd/Ag alloy. The second phase is microscopically uniformly dispersed over, and bound onto, the surface of the solid electrolyte ion transport matrix. The result achieved is a more uniform distribution of the metal or metal oxide over the surface of the matrix than is achieved by mixing of separate powders in the absence of chelation of the metal. Moreover, the physical properties and ion transport characteristics of these two-phase membranes are much improved, as compared to single phase solid electrolyte ion transport membranes or multi-phase membranes, and as compared to coated membranes prepared by conventional coating methodology.

More particularly, dual phase solid electrolyte ion transport membranes fabricated in accordance with the methodology of the invention are characterized by a second phase that is uniformly dispersed in the solid electrolyte ion transport matrix. These dual phase composite membranes exhibit enhanced mechanical and catalytic properties due to the improvement in homogeneity of the dispersed second phase. Furthermore, it was discovered that the improved homogeneity of the dispersed second phase results in a substantial decrease of the percolation threshold, which minimizes the use of second phase metals and therefore reduces the cost of fabricating composite solid electrolyte ion transport membranes.

Another advantage of the methodology of the invention is that it results in a much smaller particle size for the second phase in the solid electrolyte ion transport matrix, as compared to the particle size provided by conventional mixing methods such as powder mixing. By way of illustration, second phase particles of silver or palladium, deposited by the technique disclosed herein, range from about 0.1 to about 0.2 microns, or approximately 2 to 10 times smaller than those produced by the method of Shen et al. The reduced size of the second phase particles increases the exposed surface area of the metal for a given amount of metal used, thereby enhancing the desired electronic transport without necessarily increasing the net volume of second phase material needed.

The methodology of the present invention utilizes a liquid polymeric precursor formed by polymerizing a starting dispersion containing cations of the desired metal or metal oxide constituent, in admixture with a chelating agent and a polymerizable organic monomer or prepolymer. Preferred monomers include, by way of illustration, ethylene glycol polyacrylamide, malonic acid, polyacrylic acid, or a combination thereof. Useful chelating agents include citric acid, ethylenediamine, ethylenediamine tetraacetic acid (EDTA), and combinations thereof. The chelating agent is suitably present in the starting dispersion in an amount of from 10 to 40% based upon the weight of the dispersion. The monomer or prepolymer is suitably present in the starting dispersion in an amount of from 10 to 40% based on the weight of the dispersion.

At low temperature, the polymeric precursor forms a viscous liquid with excellent wetting properties to form a uniform coating on the surface of solid electrolyte ion transport powders. The precursor decomposes at high temperatures, leaving a uniform coating of second phase on the solid electrolyte ion transport powder.

The invention disclosed herein is intended to be applicable to mixed metal conducting oxide ceramics encompassed by the structure: $A_rA'_sA''_tB_uB'_vB''_wO_x$ where A, A'A'' are chosen from the groups 1, 2, 3 and the F block lanthanides; and B, B', B'' are chosen from the D block transition metals according to the Periodic Table of the Elements adopted by the IUPAC wherein $0<r\leq1$, $0\leq s\leq1$, $0\leq t\leq1$, $0\leq u\leq1$, $0\leq v\leq1$, $0\leq w\leq1$ and x is a number determined from stoichiometry that renders the compound charge neutral. Preferably, A, A', A'' of the enumerated structure is a Group 2 metal consisting of magnesium, calcium, strontium and barium. Illustrative lanthanide-containing metal oxide compositions also containing calcium or strontium are disclosed in U.S. Pat. No. 5,817,597 (Carolan et al.) Preferred mixed conducting oxides are presented by the formula $A'_sA''_tB_uB'_vB''_wO_x$ where A represents a lanthanide, Y, or mixture thereof, A' represents an alkaline earth metal or mixture thereof; B represents Fe; B' represents Cr, Ti, or mixture thereof and B'' represents Mn, Co, V, Ni, Cu or mixture thereof and s, t, u, v, and w each represents a number from 0 to about 1, and z is from stoichiometry.

A particularly preferred ceramic structure represented by the formula:

$$A_xA'_{x'}B_yB'_{y'}O_{3-z}$$

where

A is a lanthanide element;

A' is a suitable lanthanide element dopant;

B is selected from the group consisting of titanium, vanadium, chromium, manganese, iron, cobalt, nickel, zinc and mixtures thereof;

B' is copper;

$0.1 \leq x < 0.6$;

$0.4 < x' \leq 0.9$;

$0.1 \leq y \leq 0.9$;

$0.1 \leq y' \leq 0.9$;

$0.9 < (x+x')/(y+y') < 1.1$;

and z is determined from stoichiometry.

This ceramic structure represented by the above formula for a preferred ceramic structure is the subject of commonly assigned, co-pending U.S. application Ser. No. 09/241,610, filed Feb. 2, 1999.

The invention disclosed herein is also intended to cover oxygen ion-conducting materials or phases formed between oxides containing divalent and trivalent cations such as calcium oxide, scandium oxide, yttrium oxide, lanthanum oxide, etc., with oxides containing tetravalent cations such as zirconia, thoria, and ceria. Some of the known solid oxide transfer materials of this variety include $Y_2O_3$-stabilized $ZrO_2$, CaO-stabilized $ZrO_2$, $Sc_2O_3$-stabilized $ZrO_2$, $Y_2O_3$-stabilized $Bi_2O_3$, CaO-stabilized $CeO_2$, $Y_2O_3$-stabilized $CeO_2$, $Gd_2O_3$-stabilized $CeO_2$, $ThO_2$, $Y_2O_3$-stabilized $ThO_2$, or $ZrO_2$, $ThO_2$, $CeO_2$, $Bi_2O_3$, or $HfO_2$ stabilized by addition of any one of lanthanide oxides or alkaline earth metal oxides. Many other oxides are known which have demonstrated oxygen ion-conducting ability that could be used in the multi-phase mixtures, and they are included in the present concept.

In accordance with a second aspect of the invention, a solid electrolyte ion transport membrane is provided. The membrane comprises a first phase, made from granulated or matrix material, which conducts at least one type of ion, preferably oxygen ions, and a second phase. The second phase, which is physically distinct from the matrix material, comprises a metal or metal oxide incorporated onto the surface of the granulated or matrix material by means of the dispersion described herein. The second phase is present in a manner which increases the homogeneity of the phases within the matrix material, thereby enhancing the mechanical and/or catalytic properties of the matrix material while minimizing the amount of constituent material needed and also decreases the percolation threshold for the second phase.

A particularly advantageous multi-phase, composite material is comprised of a first mixed conductor phase, such as a perovskite and a second phase of a metal or metal oxide distributed uniformly on the surface of the first mixed conductor phase. This second phase tends to prevent microcracking of the membrane, eliminate special atmospheric control during processing and operation, and improve the mechanical properties, thermal cyclability, atmosphere cyclability and/or surface exchange rates over that of the mixed conductor phase alone. This second phase is suitably incorporated onto the surface of the mixed conductor granules using the above-described starting dispersion. The resulting dual-phase membrane exhibits improved mechanical properties, and preferably also exhibits improved catalytic properties, without sacrificing its oxygen transport performance. Further, this second phase can relieve compositional and other stresses generated during sintering, inhibit the propagation of microcracks in the mixed conductor phase and hence improve the mechanical properties (especially tensile strength) significantly. Since atmosphere control can be eliminated during sintering, manufacture is easier and less costly. The ability to eliminate atmosphere control during thermal cycling makes it substantially easier to deploy the membranes in practical systems which are more robust and better withstand transitional stresses created by temperature or gas composition variations.

Generally suitable ion transport membrane materials include ionic only and mixed conductors that can transport oxygen ions. If made according to the present invention, the mixed conductor phase may transport both oxygen ions and electrons independent of the presence of the second electronic conducting phase. Examples of mixed conducting solid electrolytes useful in this invention are provided in Table I below, but this invention is not limited solely to these material compositions listed therein. Dense matrix materials other than those comprised only of mixed conductors are also contemplated by this invention.

The method of the present invention will be particularly useful to the ceramic membrane manufacturing community since a common problem associated with such ceramic membranes is their fragility, and low mechanical strength under tension. This makes it difficult to fabricate large elements such as tubes and use them in commercial systems requiring high reliability. These limitations are overcome by the present invention. More specifically, as discussed above, the dual phase material comprised of the mixed conductor and the microscopically distributed second constituent phase tends to prevent undesired microcracking of the membrane during fabrication in air, and improve other mechanical properties of the membrane. The resulting membrane exhibits enhanced thermal/atmosphere cyclability and surface exchange rates, as compared to an analogous single-phase mixed conductor phase.

When provided as a porous coating on the surface of the membrane or as a porous electrode for solid oxide fuel cell, the surface exchange properties of the membrane are enhanced. In this case porosity is preferentially more than 10 percent and pore radii less than 10 microns and more preferably less than 2 microns.

TABLE I

Mixed Conducting Solid Electrolytes

Material Composition

1. $(La_{1-x}Sr_x)(Co_{1-y}Fe_y)O_{3-\delta}$ ($0 \leq x \leq 1$, $0 \leq y \leq 1$, $\delta$ from stoichiometry)
2. $SrMnO_{3-\beta}$
   $SrMn_{1-x}Co_xO_{3-\beta}$ ($0 \leq x \leq 1$, $\beta$ from stoichiometry)
   $Sr_{1-x}Na_xMnO_{3-\beta}$
3. $BaFe_{0.5}Co_{0.5}YO_3$
   $SrCeO_3$
   $YBa_2Cu_3O_{7-\beta}$ ($0 \leq \beta \leq 1$, $\beta$ from stoichiometry)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}ByB'_{y'}B''_{y''}O_{3-z}$ (x, x', x", y, y', y" all in 0–1 range; and z from stoichiometry)
   where:
   A, A', A" = from groups 1, 2, 3 and f-block lanthanides
   B, B', B" = from d-block transition metals
6. (a) Co—La—Bi type:  Cobalt oxide      15–75 mole %
                        Lanthanum oxide   13–45 mole %
                        Bismuth oxide     17–50 mole %
   (b) Co—Sr—Ce type:  Cobalt oxide      15–40 mole %
                        Strontium oxide   40–55 mole %
                        Cerium oxide      15–40 mole %
   (c) Co—Sr—Bi type:  Cobalt oxide      10–40 mole %
                        Strontium oxide   5–50 mole %
                        Bismuth oxide     35–70 mole %
   (d) Co—La—Ce type:  Cobalt oxide      10–40 mole %
                        Lanthanum oxide   10–40 mole %
                        Cerium oxide      30–70 mole %
   (e) Co—La—Sr—Bi type: Cobalt oxide    15–70 mole %
                        Lanthanum oxide   1–40 mole %
                        Strontium oxide   1–40 mole %
                        Bismuth oxide     25–50 mole %
   (f) Co—La—Sr—Ce type: Cobalt oxide    10–40 mole %

TABLE I-continued

Mixed Conducting Solid Electrolytes

Material Composition

Lanthanum oxide    1–35 mole %
    Strontium oxide    1–35 mole %
    Cerium oxide    30–70 mole %

7. $Bi_{2-x-y}M'_xM_yO_{3-\delta}$ ($0 \leq x \leq 1$, $0 \leq y \leq 1$, $\delta$ from stoichiometry)
   where: M' = Er, Y, Tm, Yb, Tb, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$
   where, x equals from zero to about 1.
9. One of the materials of $A_sA'_tB_uB'_vB''_wO_x$ family whose composition is disclosed in U.S. Pat. No. 5,306,411 (Mazanec et al.) as follows:
   A represents a lanthanide or Y, or a mixture thereof;
   A' represents an alkaline earth metal or a mixture Thereof;
   B represents Fe;
   B' represents Cr or Ti, or a mixture thereof;
   B" represents Mn, Co, V, Ni or Cu, or a mixture thereof;
   and s, t, u, v, w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B', B" in the formula; and
   $0.9 < (s + t)/(u + v + w) < 1.1$
10. One of the materials of $La_{1-x}Sr_xCu_{1-y}M_yO_{3-d}$ family, where:
    M represents Fe or Co;
    x equals from zero to about 1;
    y equals from zero to about 1;
    d equals a number that satisfies the valences of La, Sr, Cu, and M in the formula
11. One of the materials of $Ce_{1-x}A_xO_{2-d}$ family, where:
    A represents a lanthanide, Ru, or Y, or a mixture thereof;
    x equals from zero to about 1;
    d equals a number that satisfies the valences of Ce and A in the formula
12. One of the materials of $Sr_{1-x}Bi_xFeO_{3-d}$ family, where:
    x equals from zero to about 1;
    d equals a number that satisfies the valences of Sr, Bi and Fe in the formula
13. One of the materials of $Sr_xFe_yCo_zO_w$ family, where:
    x equals from zero to about 1;
    y equals from zero to about 1;
    z equals from zero to about 1;
    w equals a number that satisfies the valences of Sr, Fe and Co in the formula
14. Dual phase mixed conductors (electronic/ionic):
    $(Pd)_{0.5}/(YSZ)_{0.5}$ (YSZ = yttria-stabilized zirconia)
    $(Pt)_{0.5}/(YSZ)_{0.5}$
    $(B-MgLaCrO_x)_{0.5}(YSZ)_{0.5}$
    $(In_{90\%}Pt_{10\%})0.6/(YSZ)_{0.5}$
    $(In_{90\%}Pt_{10\%})0.5/(YSZ)_{0.5}$
    $(In_{95\%}Pr_{2.5\%}Zr_{2.5\%})_{0.5}/(YSZ)_{0.5}$
    Any of the materials described in 1–13, to which a high temperature metallic phase (e.g., Pd, Pt, Ag, Au, Ti, Ta, W) is added In general, the major considerations in the selection of the second, phase materials are readily apparent. These include: (1) match of thermal expansion coefficients (TEC) of the second phase and the ion transport material; (2) chemical compatibility between the second phase and the ion transport material; (3) good bonding between the second phase and the matrix of the ion transport material; (4) ductility of the second phase to relieve stresses during sintering and cooling; and (5) low cost.

TEC match is important because stress is usually set up within and around the second phase as the composite material cools down from the temperatures it is exposed to during fabrication. Selection of a material with a less-than-desired match with the second phase material may cause unwanted delamination or cracking by the thermal stress imposed during fabrication and operation of the membrane. This can be minimized by reducing the difference in the expansion coefficients between that of the ion transport material and that of the second phase.

Chemical compatibility is important because the high temperature operation and processing of ion transport materials will cause interactions and interdiffusion between the ion transport material and the second phase that may lead to the degradation of the materials and reduce the membrane performance. Therefore, the second phase should be chemically inert or should not react undesirably with the ion transport material to avoid adverse interactions and interdiffusion at high temperatures.

Good bonding is important because delamination occurring between the second phase and the ion transport material could be deleterious to the strength of the material. Cracks or flaws could easily link up and cause a failure of the material.

Ductility of the second, constituent phase is important because many ion transport materials have very high thermal expansion coefficient. High TEC's give rise to high thermal stress during the processing and operation of the ion transport materials, which may result in failure of the materials. The ductility of the second phase may relieve the stresses generated during sintering and/or cooling.

In addition to the above considerations, the catalytic activity of the second phase preferably improves surface reaction kinetics of the composite ion transport membranes. Increased catalytic activity can mitigate an otherwise higher cost of the electronic conducting phase.

The second phase is suitably a single metal, such as silver, palladium, platinum, gold, rhodium, titanium, nickel, ruthenium, tungsten, tantalum, or alloys of two or more of such metals which are stable at membrane operating temperatures. Suitable high-temperature alloys include inconel, hastelloy, monel, and ducrolloy. Silver, palladium, or silver/palladium alloy are preferred. As another alternative, the second phase can be a ceramic, such as praseodymium-indium oxide mixture, niobium-titanium oxide mixture, titanium oxide, nickel oxide, tungsten oxide, tantalum oxide, ceria, zirconia, magnesia, or a mixture thereof. Some ceramic second phases, such as titanium oxide or nickel oxide, can be introduced in the form of oxides, then reduced to metal during the operation under a reducing atmosphere.

The following examples are set forth with specific materials and process conditions to specifically exemplify the invention and should not limit the invention in any way.

EXAMPLE

Example I

Dual Phase Solid Electrolyte Ion Transport Membrane Fabricated of Ag coated $La_{0.05}Sr_{0.95}CoO_{3-x}$ (A1)

Ag (about 0.1 to 0.2 $\mu$m) coated $A_1$ mixed conductor powder (average particle size about 1.0 $\mu$m, from SSC, Inc., Woodinville, Wash., now PSC of Praxair Surface Technologies, Inc.) with 20 wt. % of Ag produced by the following method:

(a) 10.2 grams of $AgNO_3$ were dissolved into 15 ml of $H_2O$, followed by adding 2.9 grams of citric acid and 10 grams of ethylene glycol into the solution.

(b) The solution was stirred on a hot-plate (about 65° C.) until a clear solution was obtained.

(c) 5 grams of glycine were dissolved into the solution and then heated to about 100° C. to evaporate the water and accelerate the polymerization of chelating complexes.

(d) After about 10 minutes a viscous and transparent system was obtained. 25.9 grams of $A_1$ was then introduced into the system and a vigorous stirring was applied to obtain a homogeneous system.

(e) The system was then heated to about 300° C. on the hot plate until a thick paste was obtained, then the temperature was increased to about 500° C. to carry out a combustion process.

(f) After the combustion, the Ag coated $A_1$ was calcined at 600° C. for 4 hours, then milled and sieved for further applications. Dual phase discs were then prepared by mixing the Ag coated $A_1$ powder with 3 wt. % of PVB (Butvar of Monsanto) then pressed under a 1.5" die using a pressure of 10.4 kpsi. This was followed by burn-out of the binder while raising the temperature at the rate of 1° C./min from 25 to 400° C. The final temperature was held for one hour, and then sintering of the discs was effected at 1100° C. for 2 hours with a heating/cooling rate of 2° C./min in air.

Microstructures of the sintered discs were obtained using a Nikon Epiphot 200 optical microscope. X-ray diffraction (XRD) analyses were performed using a Rigaku miniflex diffractometer with Cu $K_\alpha$ radiation for the study of second phase formation within the solid electrolyte ion transport matrix. The oxygen permeation rate was measured using sintered disc specimens sealed in an alumina test cell with Ag paste. Tests were performed on three dense $A_2$ discs ($A_1$ with 20 wt. % Ag by conventional mixed powder) and three dense $A_3$ discs ($A_1$ coated with 20 wt. % Ag by current invention) of decreasing thickness (1.1 mm to 0.3 mm) at 900° C. under an air/helium gradient. A HP 5890 Gas Chromatograph and oxygen analyzer were used to analyze the gas compositions and calculate the oxygen fluxes.

Figure 3:
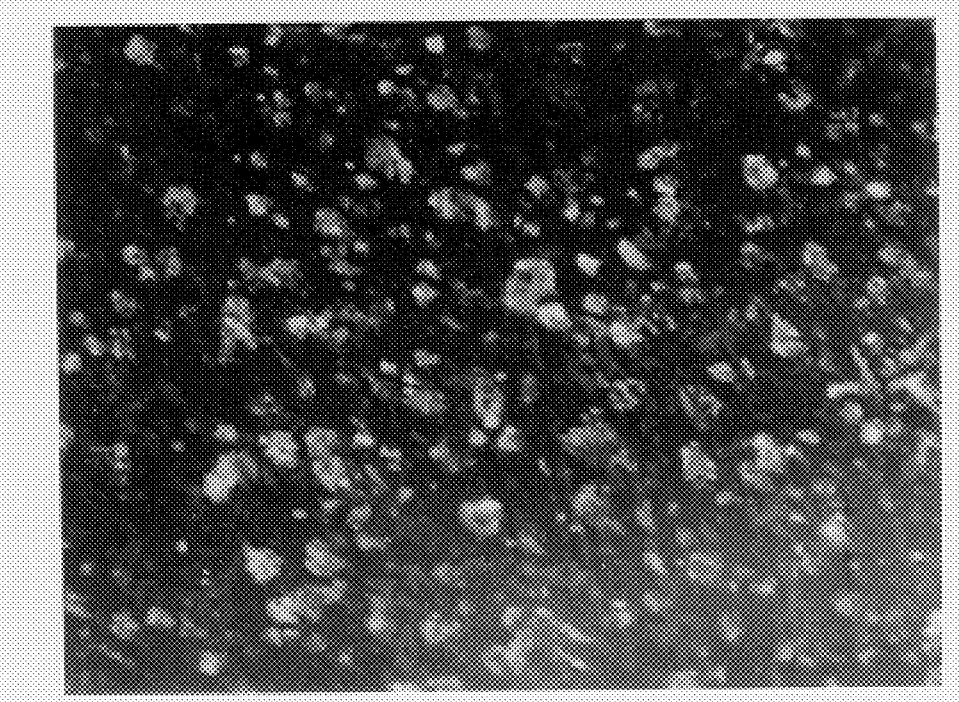
FIG. 3 is an optical photomicrograph of a disc made by a conventional powder mixed process displayed at a magnification of approximately 165 times.
Figure 4:
FIG. 4 is an optical photomicrograph of a disc made in accordance with the present invention displayed at a magnification of approximately 165 times.
Figure 5:
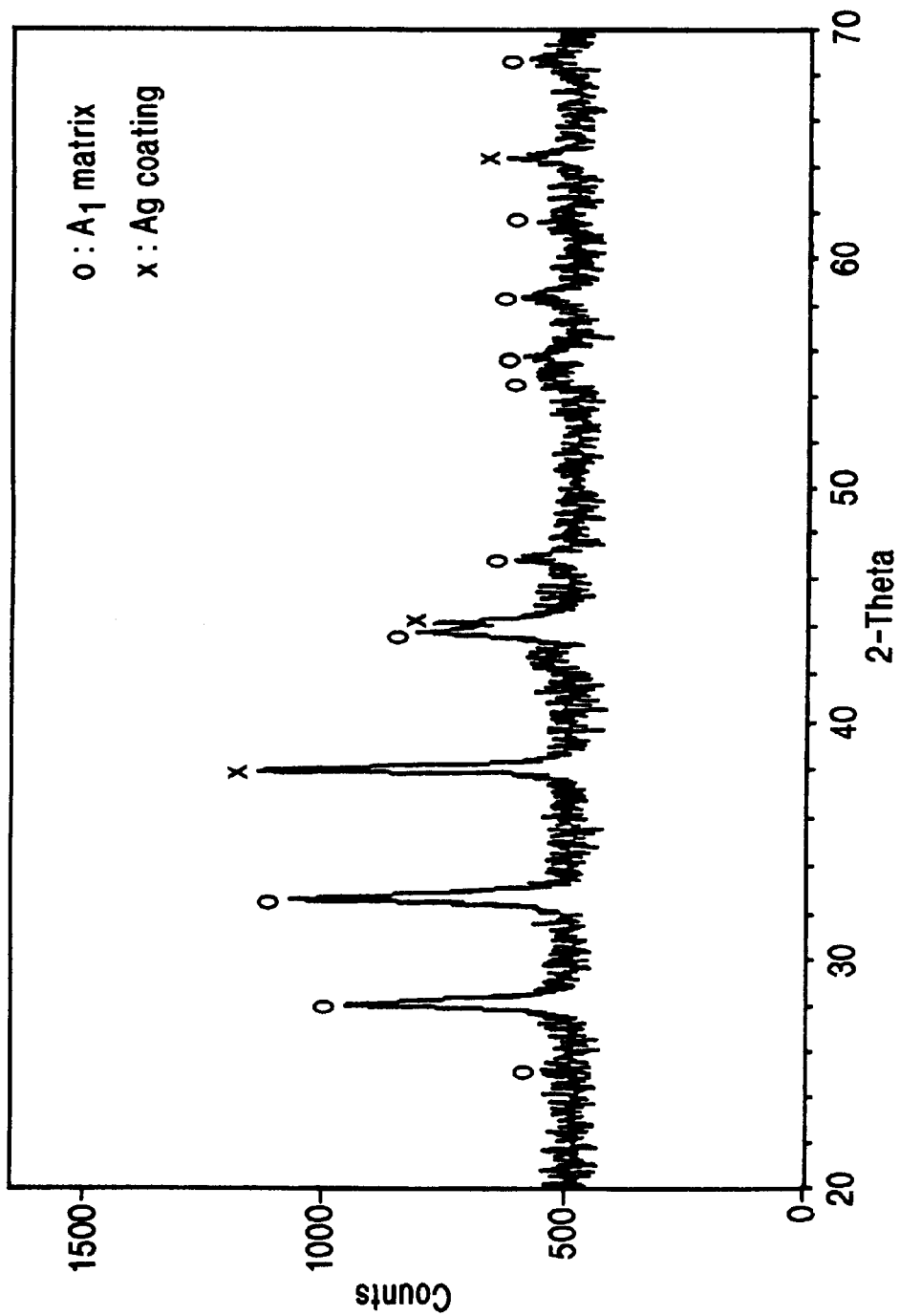
FIG. 5 shows an X-ray diffraction pattern illustrating the formation of a silver coating (Ag coating) on the powder matrix ($A_1$ matrix) of the present invention.
Figure 6:
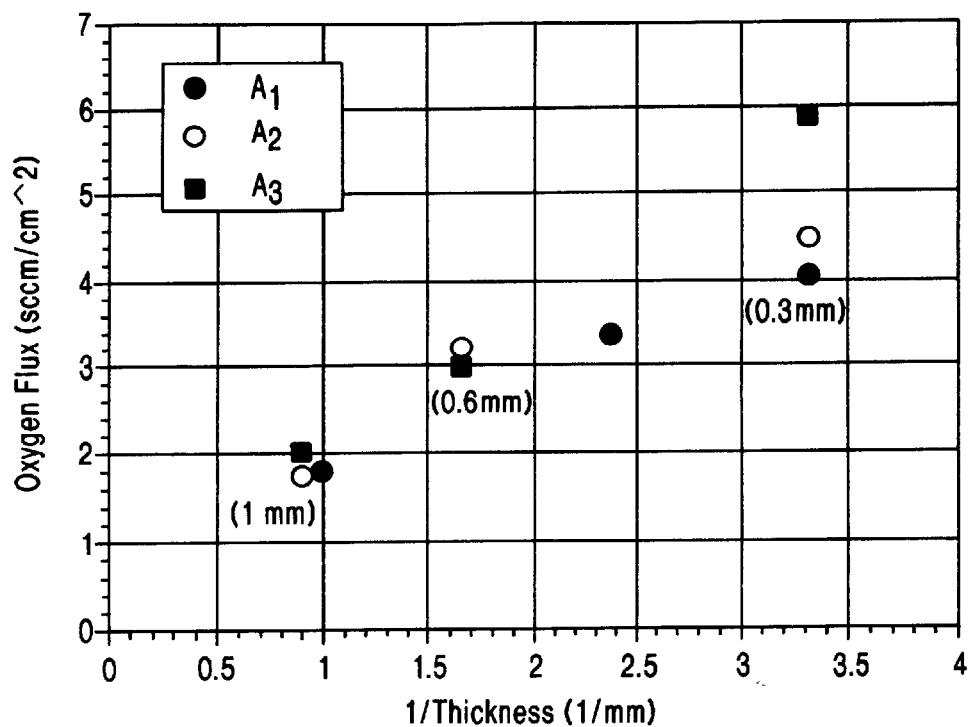
FIG. 6 is a graph depicting a comparison of oxygen flux as a function of thickness, at 900° C., through a single phase disc ($A_1$), a conventional dual phase disc ($A_2$), and a dual phase disc of the present invention ($A_3$).
Figure 7:
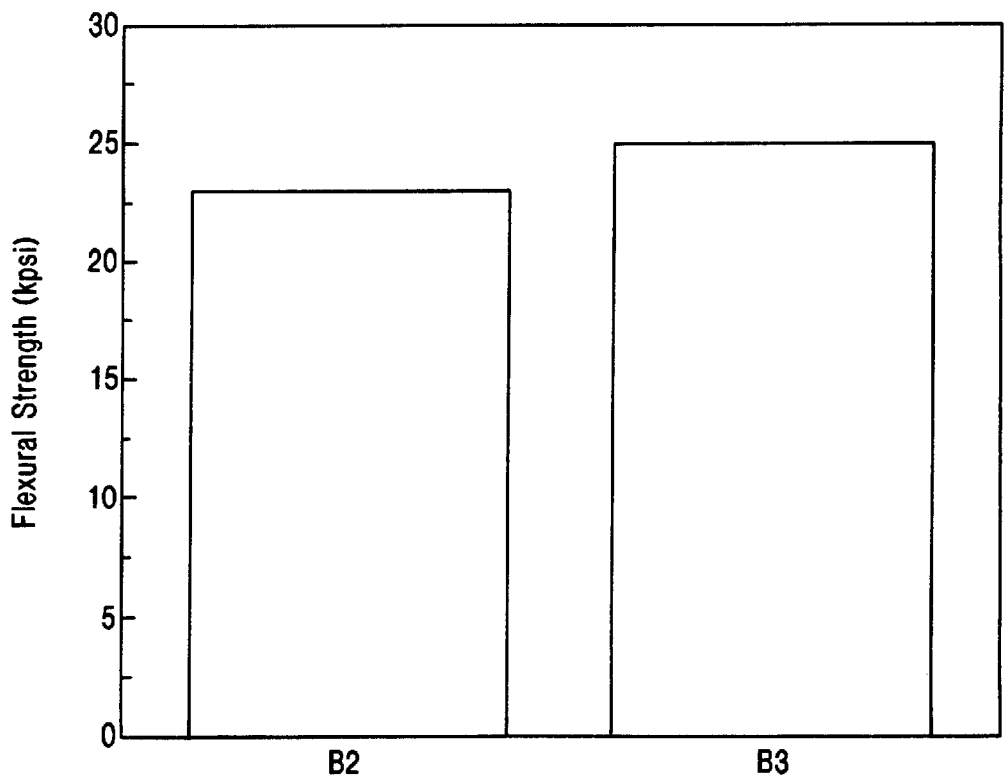
FIG. 7 is a graph depicting a comparison of flexural strength of a conventional disc ($B_2$) and a disc of the present invention ($B_3$).
Figure 8:
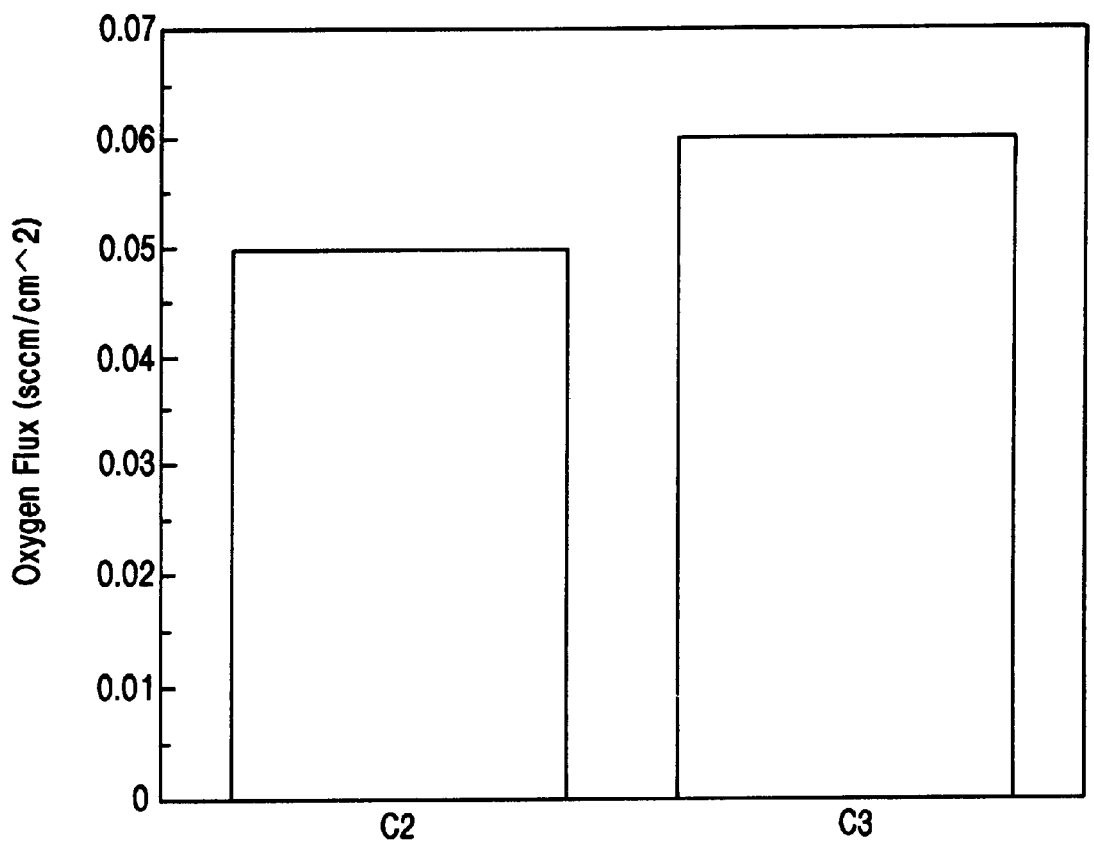
FIG. 8 is a graph depicting a comparison of oxygen flux through a conventional disc ($C_2$) and a disc of the present invention ($C_3$), at 900° C. under an air/helium gradient.

FIG. 3 and FIG. 4 show optical photomicrographs of discs made by conventional powder processing methods and by the method of the present invention. Compared to the disc made by a conventional powder mixing process (FIG. 3), the disc obtained by the method of the current invention (FIG. 4) showed a much finer and more uniform dispersion of the second phase (white area) in the $A_1$ matrix. The X-ray diffraction ("XRD") result (FIG. 5) shows the formation of Ag coating within the $A_1$ matrix. It also reveals a good compatibility between the Ag coating and $A_1$ matrix without forming any other detectable phase. FIG. 6 shows the $O_2$ fluxes through the discs as a function of 1/thickness at 900° C. for $A_1$, $A_2$, and $A_3$. For 1.1 mm to 0.6 mm disks the $O_2$ fluxes of three compositions are comparable. For 0.3 mm disk the $O_2$ flux (5.9 sccm/cm$^2$) of $A_3$ is significantly higher than those of $A_1$ and $A_2$ (3.2 and 4.5 sccm/cm$^2$). The increase in $O_2$ flux with 1/t is also more linear with $A_3$ than the other two specimens suggesting that the surface exchange rates are more rapid with this material. The enhancement of surface kinetics of $A_3$ is another feature that can be attributable to the fine second phase (Ag) well-dispersed on the surface of $A_1$ matrix.

Example II

Dual Phase Solid Electrolyte Ion Transport Membrane Fabricated of 50/50 Pd/Ag (50Pd/50Ag) coated $La_{0.2}S_{0.8}Fe_{0.69}Co_{0.1}Cr_{0.2}Mg_{0.01}O_x$ (hereinafter, $B_1$).

A 20 wt. % of 50Pd/50Ag (about 0.1 to 0.2 $\mu$m) coated $B_1$ mixed conductor powder (average particle size ~1.0 $\mu$m, form SSC, Inc. Woodinville, Wash., now PSC of Praxair Surface Technologies, Inc.) was produced by the following method:

(a) 3.94 grams of $AgNO_3$ and 5.42 grams of $Pd(NO_3)_2$ were dissolved into 15 ml of $H_2O$ followed by adding 2.24 grams of citric acid and 28 grams of ethylene glycol into the solution.

(b) The solution was stirred on a hot-plate (about 65° C.) until a clear solution was obtained.

(c) 3.5 grams of glycine were dissolved into the solution and then heated to about 100° C. to evaporate the water and accelerate the polymerization of chelating complexes.

(d) After about 10 minutes a viscous and transparent system was obtained. 20 grams of $B_1$ powder was then introduced into the system and vigorous stirring was applied to obtain a homogeneous system.

(e) The system was then heated to about 300° C. on the hot plate until a thick paste was obtained, then the temperature was increased to about 500° C. to carry out a combustion process.

(f) After the combustion, the 50Pd/50Ag coated $B_1$ was calcined at 600° C. for 4 hours, then milled and sieved for further applications.

Dual phase bars were prepared by mixing the 50Pd/50Ag coated $B_1$ powder with 3 wt. % of PVB (Butvar of Monsanto) then pressed in a rectangular die using a pressure of 10.4 kpsi followed by the binder burn-out process (1° C./min from 25 to 400° C. and hold for 1 hour), and sintered at 1250° C. for 2 hours with a heating/cooling rate of 2° C./min in air.

Room temperature 3-point bending tests were performed on four bar specimens of $B_2$ ($B_1$ with 20 wt. % 50Pd/50Ag by current invention). All specimens (30×4×3 mm) were cut and polished using synthetic diamond discs prior to testing to avoid any edge imperfections. FIG. 5 shows the flexural strength comparison of $B_2$ and $B_3$ specimens under similar testing conditions. An average flexural strength of 25.0 kpsi was obtained for $B_3$. As compared to that of $B_2$ (23.0 kpsi), about 10% strength enhancement was obtained indicating that the mechanical strength of $B_2$ can be improved by the coating powder process due to the uniform finely dispersed second phase.

Example III

Dual Phase Solid Electrolyte Ion Transport Membrane Fabricated of 50Pd/50Ag coated $Ce_{0.8}Gd_{0.2}O_{2-x}$ (hereinafter, $C_1$).

20 wt. % (13 vol. %) of 50Pd/50Ag (about 0.1 to 0.2 μm) coated with $C_1$ powder (oxygen ion conductor with an average particle size about 1.0 μm, from SSC, Inc., Woodinville, Wash., now PSC of Praxair Surface Technologies, Inc.) was produced by the following method:

(a) 3.94 grams of $AgNO_3$ and 5.42 grams of $Pd(NO_3)_2$ were dissolved into 15 ml of $H_2O$, followed by adding 2.24 grams of citric acid and 28 grams of ethylene glycol into the solution.

(b) The solution was stirred on a hot-plate (about 65° C.) until a clear solution was obtained.

(c) 3.5 grams of glycine were dissolved into the solution and then heated to about 100° C. to evaporate the water and accelerate the polymerization of chelating complexes.

(d) After about 10 minutes a viscous and transparent system was obtained. 20 grams of $C_1$ powder was then introduced into the system and a vigorous stirring was applied to obtain a homogeneous system.

(e) The system was then heated to about 300° C. on the hot plate until a thick paste was obtained, then the temperature was increased to about 500° C. to carry out a combustion process.

(f) After the combustion, the 50Pd/50Ag coated $C_1$ was calcined at 600° C. for 4 hours, then milled and sieved for further applications.

Dual phase discs were prepared by mixing the 50Pd/50Ag (13 vol. %) coated $C_1$ powder with 3 wt. % of PVB (Butvar of Monsanto) then pressed under a 1.5" die using a pressure of 10.4 kpsi followed by the binder burn-out process (1° C./min from 25 to 400° C. and hold for 1 hour), and sintered at 1250° C. for 2 hours with a heating/cooling rate of 2° C./min in air.

The oxygen permeation rate was measured on sintered disc specimens sealed in an alumina test cell with Ag paste. Tests were performed on a $C_2$ disc ($C_1$ mixed with 50 vol. % of Pd by the conventional process) and $C_3$ discs ($C_1$ coated with 13 vol. % 50Pd/50Ag by the method of the current invention) at 900° C. under an air/helium gradient. A HP 5890 Gas Chromatograph and oxygen analyzer were used to analyze the gas compositions and calculate the oxygen fluxes.

It was found that $C_3$ (13 vol. % of 50Pd/50Ag) is electronically conductive by 2-point impedance measurement after sintering at. 1250° C. which indicates the percolation limit can be reduced to about 13 vol. % from 33 vol. % resulting from a conventional powder-mixed process using the method of the current invention. The cost of second phase using the current invention can be reduced about three-fold from that for a conventional powder-mixed process. FIG. 6 shows an oxygen flux comparison of $C_2$ and $C_3$ discs at 900° C. under an air/helium gradient. The oxygen flux of $C_3$ is slightly higher than that of $C_2$. This result demonstrates that the oxygen flux of $C_2$ can be improved by the process of the present invention by taking advantage of the resulting uniform surface-dispersion (and small particle size) of the metal oxide surface coating. This facilitates the use of a reduced amount of metal oxide second phase.

Figure 2:
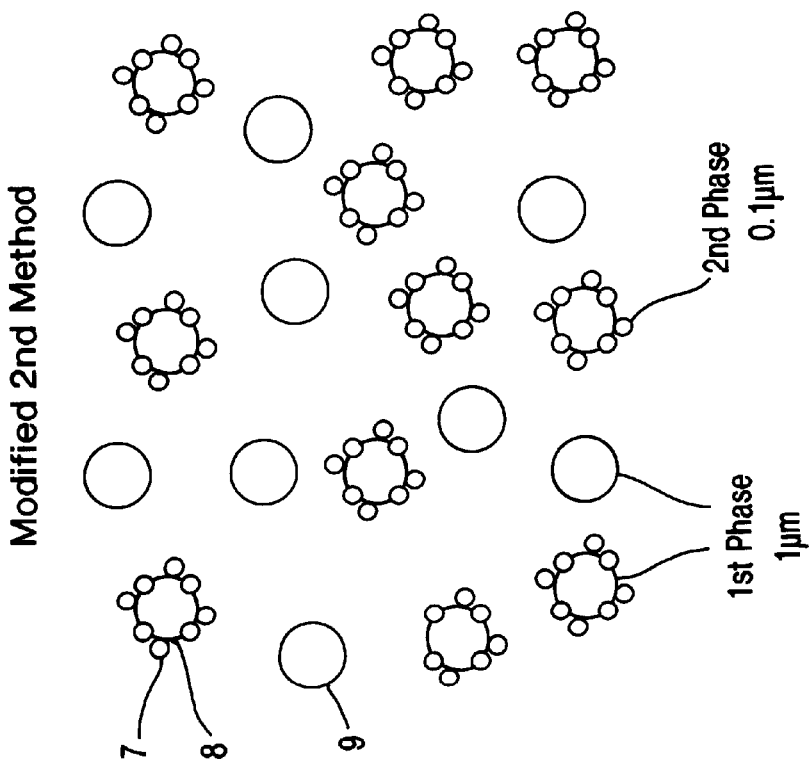
FIG. 2. is a schematic drawing showing two embodiments of a second method of preparing a membrane of this invention.
Figure 2:
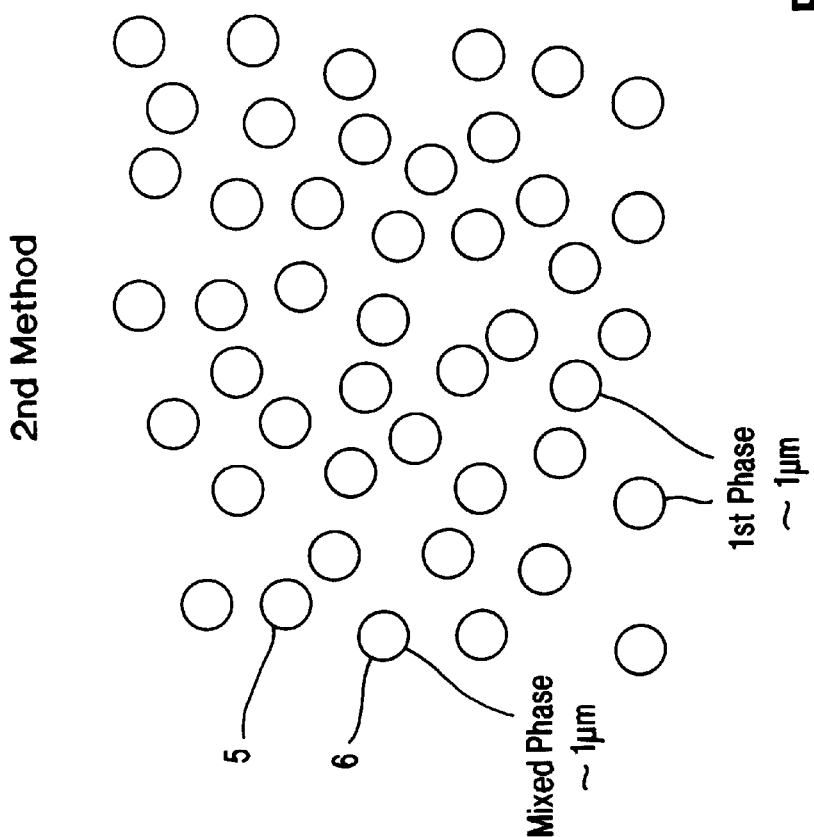

The second method (FIG. 2) prepares a dual phase membrane by mixing an ion conducting powder 5 with a composite ion and electron conducting powder 6, produced by spray pyrolysis or other suitable method, and then sintering the mixture to achieve an overall porous or nonporous structure as desired. It is important that the second powder comprises a mix of ion and electron conducting materials at the level of the individual grains and that the second electronic conducting phase form a continuous network upon sintering The electronically conducting phase can comprise silver, gold, platinum, palladium, rhodium, ruthenium, nickel, an alloy chosen from among these metals, various alloys that are corrosion resistant such as Haynes 230 alloy, bismuth oxide, a praseodeminium-indium oxide mixture, a cerium-lanthanum oxide mixture, a titanium oxide mixture, doped ruthenates such as $Ln_2Ru_2O_7$ (Ln=lanthanide or alkaline earth metals, or an electron-conductive mixed metal oxide of a perovskite structure, with the perovskite having the general formula $[A_aA'_b][B_xB'_y]O_{3-\delta}$, wherein A is chosen from the Group IIA metals, Mg, Ca, Sr, Ba, or some mixture thereof, A' is chosen from among the rare earth metals and lanthanides or actinides, La, Y, Ce, Or, Nd, Pm, Sm, Eu, Tb, Dy, Ho, Er, Tm, Yb, Lu, Th, or U, or some mixture thereof; B' is chosen from among Fe, Mn, Cr, V, or Ti, or some mixture thereof; B' is chosen from among Cu or Ni or some mixture thereof:

$0 < a \leq 1, 0 < b < 1, 0 < x < 1, 0 < y < 1$; and δ is determined by the valence of the other metals. Any electronically conducting phase is within the scope of this invention.

Precursor salts to the various electronic conducting phase components can be employed. These salts can be nitrates, carbonates, oxalates, chlorides, acetates, sulfates, or any other salt that decomposes under processing conditions to generate the desired second phase. The salts or other forms of the second phase can be applied as thin films by spray coating, impregnation, slurry coating, or any other convenient technique known in the art that achieves the objective of distributing the second phase precursors over the surface of the majority phase.

The oxide ion conducting phase can be any oxide ion conducting material, such as, but not limited to stabilized zirconia, stabilized bismuth oxide, aurivillius phases, or cerium oxide alone or doped with any other elements that can provide a lower valent oxidation state (<4) and promote the formation of oxide ion vacancies, such as Pr,Nd, Pm, Sm, Eu, Gd, Dy, Ho, Er, Tm, Yb, Lu, Y, La, Ga, Al,or alkaline earths such as Mg, Ca, Sr, or Ba. The dopant metal can be present from 0.01 to 50 mol percent in the ceria, but usually 2 to 30 mol percent provides best ion conductivity.

A modification (FIG. 2) of the method involves borrowing from the methodology of the first method discussed earlier. In this case the electronic conducting phase 7 is distributed over the surface of a portion of the first phase particles 8. The resulting particles are then mixed with the remaining portion of the first phase particles 9 and a dense membrane or porous layer formed from the mixture and subsequently sintered. The salts or other forms of the second phase can be applied as thin films by spray coating, impregnation, slurry coating, or any other convenient technique known in the art that achieves the objective of distributing the second phase precursors over the surface of the first portion of the majority phase particles. The preferred method involves mixing a polymeric precursor containing chelated second phase metal ions with a portion of the first phase powder 8, followed by drying the precursor at about 80° C. to form a coating over the surface of the powder, and subsequent decomposition of the precursor to form a thin noncrystalline coating of the second phase on the surface of the first phase powder. The density and surface morphology of the coating can be controlled by the concentration and the chemistry of the precursor. The coated particles thus obtained are mixed with the remainder of the first phase particles 9 in proportions within the percolation limits of the two powders and processed as before to produce a dense or porous layer as desired.

If, for example, particles of the first phase are provided with a coating of the second phase comprising 10 percent of the combined volume, and then mixed with particles of the first phase in a 40 to 60 volumetric ratio, the resulting material will contain only 4 percent of the second phase while still providing a continuous network. It should be noted that the above techniques can also be employed to improve the mechanical properties of mixed conducting perovskites by inclusion of a minority metallic phase such as palladium. In this case the fact that the volume of the expensive metallic phase can be minimized, while still retaining uniform distribution, has a significant economic advantage.

For other dual phase membranes the appropriate phases and precursors can be chosen. This would include such membranes as those that transport hydrogen ions, carbonate, sulfate, nitrate, ammonium, sulfur, or other atomic or molecular ions.

Any of the dual phase membranes of the invention can be coated with porous layers, on one or both sides, optionally prepared according to the methods of this invention, to enhance the so-called three phase contact region believed to be necessary for oxygen activation and recombination. It could be desirable to have the electronically conducting phase the majority phase in the porous layers to connect the widely separated electronically conducting short circuits, to reduce local current density problems that might arise, by averaging the current over the entire membrane. For optimum effectiveness the porous layers should be thicker than 5 microns, have a porosity greater than 10 percent, and pore radii smaller than 2 microns.

The minority phase in the porous or dense layers prepared by the aforementioned methods is present in proportions such it occupies from 0.1 to 25 percent of the layer volume and preferably from 1 to 20 percent of the layer volume. The ionic and electronic conductivities are greater than 0.01 S/cm at 1000° C.

Specific Example

A composite powder was prepared by spray pyrolysis of a mixture of Pd, Ce, and Gd salts in the ratio that generates 40 percent by volume of Pd metal in the finished powder. This powder was mixed in a 50/50 mixture with CeGdO powder prepared in a standard way. The material was mixed thoroughly with the resulting mixture containing 20 percent by volume of Pd. The powder mixture was then pressed into a 1 thick 25 mm dia. disk and sintered at 1500° C. The disk was fitted into a membrane test reactor and heated to 1000° C. Excellent oxygen flux was obtained when one side of the membrane was exposed to atmospheric air and the other side to a low oxygen partial pressure thereby indicating continuous electronic and ionic conductivity.

The advantages of the invention manufactured according to any of the three mentioned methods are: i) Higher oxygen flux due to greater volume fraction of the ion conducting phase; ii) less expensive membranes or porous layers due to smaller use of an expensive second metallic phase such as Pt or Pd; iii) improved mechanical and catalytic properties when prepared with a second metallic phase.

It is well within the scope of this invention to deposit thin porous and dense layers prepared according to the methods of this invention onto porous support substrates. Preferentially these are fabricated from stronger less expensive metal oxides such as YSZ, ceria, alumina or oxidation resistant metal alloys such as Hastalloy or Inconel. These substrates should feature porosities greater than 25 percent and have pore radii greater than 2 microns and preferably greater than 5 microns.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A multi-phase solid electrolyte dense or porous matrix exhibiting ion and electronic conductivity comprising
 a first phase in the form of a mixed metal oxide having ionic conductivity and a second phase being an electronic conducting metal, alloy or mixed metal oxide distributed throughout such matrix, said second phase comprising at least one percent and less than thirty percent of the volume of said matrix and the first and second phases bound to one another.

2. The matrix of claim 1 that is produced from a powder precursor by incorporating said second phase into said powder precursor by deposition, at an elevated temperature, of metal or metal oxide from a polymer, said polymer being fabricated by polymerizing a chelated metal dispersion in a polymerizable organic monomer or prepolymer in order to provide said matrix comprising said first phase being a ceramic material and said second phase being particles of a metal or metal oxide, said particles being bound to an outer surface of said ceramic material.

3. The matrix of claim 1 that is produced from an admixture of at lease two powders, at least one of said two powders containing an admixture of said first phase and said second phase.

4. The matrix of claim 1 wherein said second phase comprising less than twenty percent of the volume of said matrix.

5. The matrix of claim 1 wherein said second phase comprising less than ten percent of the volume of said matrix.

6. The matrix of claim 1 wherein said second phase is uniformly distributed throughout said first phase.

7. The matrix of claim 1 wherein the ionic and electronic conducting phases comprise two continuous interpenetrating networks.

8. The matrix of claim 1 additionally having ionic and electronic conductivities are each greater than 0.01 S/cm at 1000° C. in air.

9. The matrix of claim 1 wherein said first phase comprises a composition selected from the group consisting of doped cerium oxide, doped zirconia of the general formula MCeOx where M=Lanthenide or Y; doped zirconium oxide of the general formula MZrOx, where M=Lanthenide, Y, or Ca; LaSrGaMgOx type; and doped Bismuth oxide of the general formula MBiOx where M=Y, Mo, W, and combinations thereof.

10. The matrix of claim 1 where said second phase comprises a metal selected from the group consisting of Pd, Au, Ag, Pt, Ni, Co, alloys thereof, and combinations thereof.

11. The matrix of claim 1 wherein said second phase comprises a conducting perovskite of the general formula LaSrMOx, where M is a transition metal.

12. The matrix of claim 1 that is fabricated from particles wherein said second phase is distributed on the surface of the particles prior to formation of a dense element comprising the matrix.

13. The matrix of claim 1 where said second phase is deposited on surfaces of particles of the first phase by deposition of chelated metal or metal oxide from a liquid polymerizable medium in which said second phase is chelated.

14. The matrix of claim 1 comprising first particles comprising said first phase and second particles comprising an admixture of said first phase and said second phase, said second particles comprising at least thirty percent and less than 70 percent by volume of said matrix.

15. The matrix of claim 14 where said second particles comprise ion conducting metallic oxides having said second phase distributed on the surface thereof.

16. The matrix of claim 1 being a dense matrix having no connected-through porosity, said dense matrix serving as an ion transport membrane.

17. The dense matrix of claim 16 having an adjacent porous layer supported on a porous support.

18. The matrix of claim 17 wherein said porous layer has a porosity of greater than 10 percent and average pore radii smaller than two microns.

19. The matrix of claim 18 wherein the porous support has a porosity greater than 25 percent and pore radii greater than five microns.

20. The matrix of claim 17 wherein said porous support is selected from the group consisting of perovskites, ceria, zirconia, and combinations therof.

21. The matrix of claim 1 being porous and serving as an electrode of solid oxide fuel cells or electrodes of electrically driven ion transport membranes.

22. The matrix of claim 1 being a porous matrix that serves as a surface coating for ion transport membranes having pore radii smaller than 10 micron.

* * * * *

UNITED STATES PATENT AND TRADEMARK OFFICE
CERTIFICATE OF CORRECTION

PATENT NO. : 6,332,964 B1
DATED : December 25, 2001
INVENTOR(S) : Chen et al.

Page 1 of 1

It is certified that error appears in the above-identified patent and that said Letters Patent is hereby corrected as shown below:

<u>Title page</u>,
Change the title from "MULTI-PHASE SOLID ION AND ELECTRON CONDUCTING MEMBRANE WITH LOW VOLUME PERCENTAGE ELECTRON CONDUCTING PHASE AND METHODS FOR FABRICATING" to -- MULTI-PHASE SOLID ION AND ELECTRON CONDUCTING MEMBRANE WITH LOW VOLUME PERCENTAGE ELECTRON CONDUCTING PHASE AND METHODS FOR FABRICATING SAME --.

Signed and Sealed this

Sixteenth Day of April, 2002

Attest:

JAMES E. ROGAN
Attesting Officer
*Director of the United States Patent and Trademark Office*